(12) United States Patent
Reichert et al.

(10) Patent No.: US 7,626,175 B2
(45) Date of Patent: Dec. 1, 2009

(54) METHOD OF AND SYSTEM FOR OBTAINING LINEAR DATA FOR OBJECT SCANNED USING NON-COLLIMATED, POLY-ENERGETIC X-RAYS

(75) Inventors: Peter A. Reichert, Boston, MA (US); Govindarajan T. Srinivasan, Portsmouth, NH (US); Joseph F. Wrinn, Winchester, MA (US); Michael W. Hamblin, Stow, MA (US)

(73) Assignee: Teradyne, Inc., North Reading, MA (US)

( * ) Notice: Subject to any disclaimer, the term of this patent is extended or adjusted under 35 U.S.C. 154(b) by 0 days.

(21) Appl. No.: 12/193,235

(22) Filed: Aug. 18, 2008

(65) Prior Publication Data

US 2009/0218498 A1 Sep. 3, 2009

Related U.S. Application Data

(60) Provisional application No. 61/032,914, filed on Feb. 29, 2008, provisional application No. 61/036,640, filed on Mar. 14, 2008.

(51) Int. Cl.
*G01T 1/00* (2006.01)
*G06K 9/36* (2006.01)

(52) U.S. Cl. .................... 250/370.09; 382/274

(58) Field of Classification Search ............ 250/363.01, 250/363.09, 370.09; 382/274
See application file for complete search history.

(56) References Cited

OTHER PUBLICATIONS

V. Dorobantu, "X-rays linear attenuation coefficient in steel. I. Thickness dependence," NDT.net, Dec. 2004, vol. 12, No. 12.
U.S. Appl. No. 12/193,321, filed Aug. 18, 2008, Srinivasan et al.

*Primary Examiner*—David P Porta
*Assistant Examiner*—Mark R Gaworecki
(74) *Attorney, Agent, or Firm*—Joseph M. Maraia; Foley & Lardner LLP

(57) ABSTRACT

According to one embodiment, a system for linearizing image data corresponding to one or more objects and output by an imaging device is provided. The system includes a processor configured for: receiving the image data from the imaging device; and producing a generally linear relationship between the image data and a thickness of the one or more objects. The generally linear relationship is produced according to the equation $$I = I_o e^{-\frac{\mu}{\sqrt{l}} l}.$$

I is an intensity of the image data, $I_0$ is an intensity of energy produced by the imaging device for outputting the image data, $\mu$ is an attenuation coefficient of the one or more objects, and l is the thickness of the one or more objects.

20 Claims, 5 Drawing Sheets

METHOD OF AND SYSTEM FOR OBTAINING LINEAR DATA FOR OBJECT SCANNED USING NON-COLLIMATED, POLY-ENERGETIC X-RAYS

CROSS-REFERENCE TO RELATED PATENT APPLICATIONS

This application claims priority to U.S. Provisional Patent Application No. 61/032,914, filed on Feb. 29, 2008, and U.S. Provisional Patent Application No. 61/036,640, filed on Mar. 14, 2008, the contents of all of which are incorporated herein by reference in their entirety.

BACKGROUND OF THE INVENTION

Embodiments of the present invention relate generally to an analytical model concerning the imaging (of any of various materials) using non-collimated, poly-energetic energy such as, but not limited to, non-collimated, poly-energetic X-ray energy.

Imaging systems such as systems employing X-ray energy may be used to produce one or more images of a certain object (or device). As incident X-ray energy passes through the object, portions of the energy may be absorbed by the object. Remaining portions of the energy (i.e., energy that is not absorbed) may be detected by detection sensors positioned adjacent the object. The sensors may produce image data (e.g., grayscale values) corresponding to the object, based on the detected energy.

The produced image data may be analyzed to derive, for example, the thickness of the object (or one or more portions thereof—if, for example, certain portions of the object are thicker than other portions). The relationship between the absorption of X-ray energy and the thickness of an object has been modeled using the Beer-Lambert law. This model has proven suitable assuming that the X-ray energy is mono-energetic and/or is produced by a collimated source. However, this model becomes less suitable when the X-ray energy is poly-energetic and/or is produced by a non-collimated source. A non-collimated source may be used, for example, to reduce cost (when non-collimated sources are less expensive than collimated sources).

SUMMARY OF THE INVENTION

An aspect of embodiments of the present invention is directed to linearizing a response of an imaged object to poly-energetic energy and/or energy produced by a non-collimated source. By linearizing the response, certain characteristics of the imaged object (e.g., the thickness of the object) may be determined and/or estimated more readily.

According to one embodiment, a system for linearizing image data corresponding to one or more objects and output by an imaging device is provided. The system includes a processor configured for: receiving the image data from the imaging device; and producing a generally linear relationship between the image data and a thickness of the one or more objects. The generally linear relationship is produced according to the equation $$I = I_o e^{\frac{\mu}{\sqrt{l}} l}.$$

I is an intensity of the image data, $I_0$ is an intensity of energy produced by the imaging device for outputting the image data, $\mu$ is an attenuation coefficient of the one or more objects, and l is the thickness of the one or more objects.

According to another embodiment, a system for linearizing image data corresponding to one or more objects and output by an imaging device is provided. The system includes: means for receiving the image data from the imaging device; and means for producing a generally linear relationship between the image data and a thickness of the one or more objects. The generally linear relationship is produced according to the equation $$I = I_o e^{\frac{\mu}{\sqrt{l}} l}.$$

I is an intensity of the image data, $I_0$ is an intensity of input energy produced by the imaging device for outputting the image data, $\mu$ is an attenuation coefficient of the one or more objects, and l is the thickness of the one or more objects.

According to another embodiment, a method for linearizing image data corresponding to one or more objects and output by an imaging device is provided. The method includes: receiving the image data from the imaging device; and producing a generally linear relationship between the image data and a thickness of the one or more objects. The generally linear relationship is produced according to the equation $$I = I_o e^{\frac{\mu}{\sqrt{l}} l}.$$

I is an intensity of the image data, $I_0$ is an intensity of energy produced by the imaging device for outputting the image data, $\mu$ is an attenuation coefficient of the one or more objects, and l is the thickness of the one or more objects.

DETAILED DESCRIPTION OF THE PREFERRED EMBODIMENTS

Embodiments of the invention relate to a modeling of the absorption of X-ray energy by an object (or device). In particular embodiments, the X-ray energy is poly-energetic and/or is produced by a non-collimated source. According to one embodiment, a non-collimated source does not include a beam-hardening filter(s) for removing lower-energy photons. As a result, the mean energy of an X-ray beam may increase as the beam passes through an object absorbing the lower-energy photons.

Although certain embodiments are described herein with reference to inspection systems using X-ray energy, other embodiments may be applied in other contexts including, but not limited to, inspection, imaging, and/or test systems employing X-rays or other suitable forms of electromagnetic energy.

Figure 1:
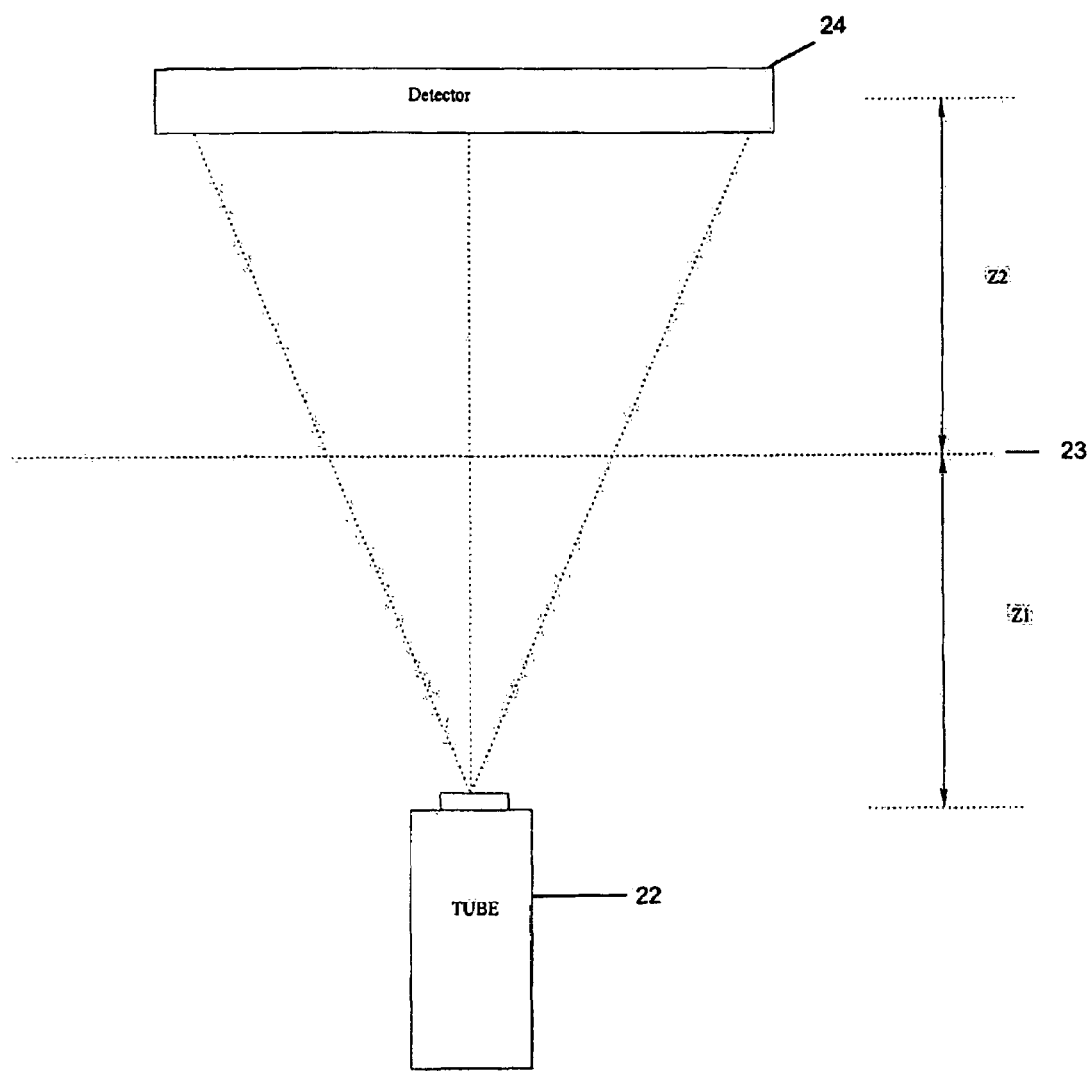
FIG. 1 shows an inspection system according to one embodiment.

With reference to FIG. 1, an X-ray inspection system according to one embodiment is shown. The system includes an X-ray source 22 (such as, but not limited to, an X-ray tube) positioned opposite an X-ray detector 24. In one embodiment, the detector 24 is a detection panel including a plurality of pixels. The detection panel may be generally flat. In a particular embodiment, the detector 24 is composed of 2496× 2304 generally square-shaped pixels, each pixel having a length of approximately 50 μm.

Figure 2:
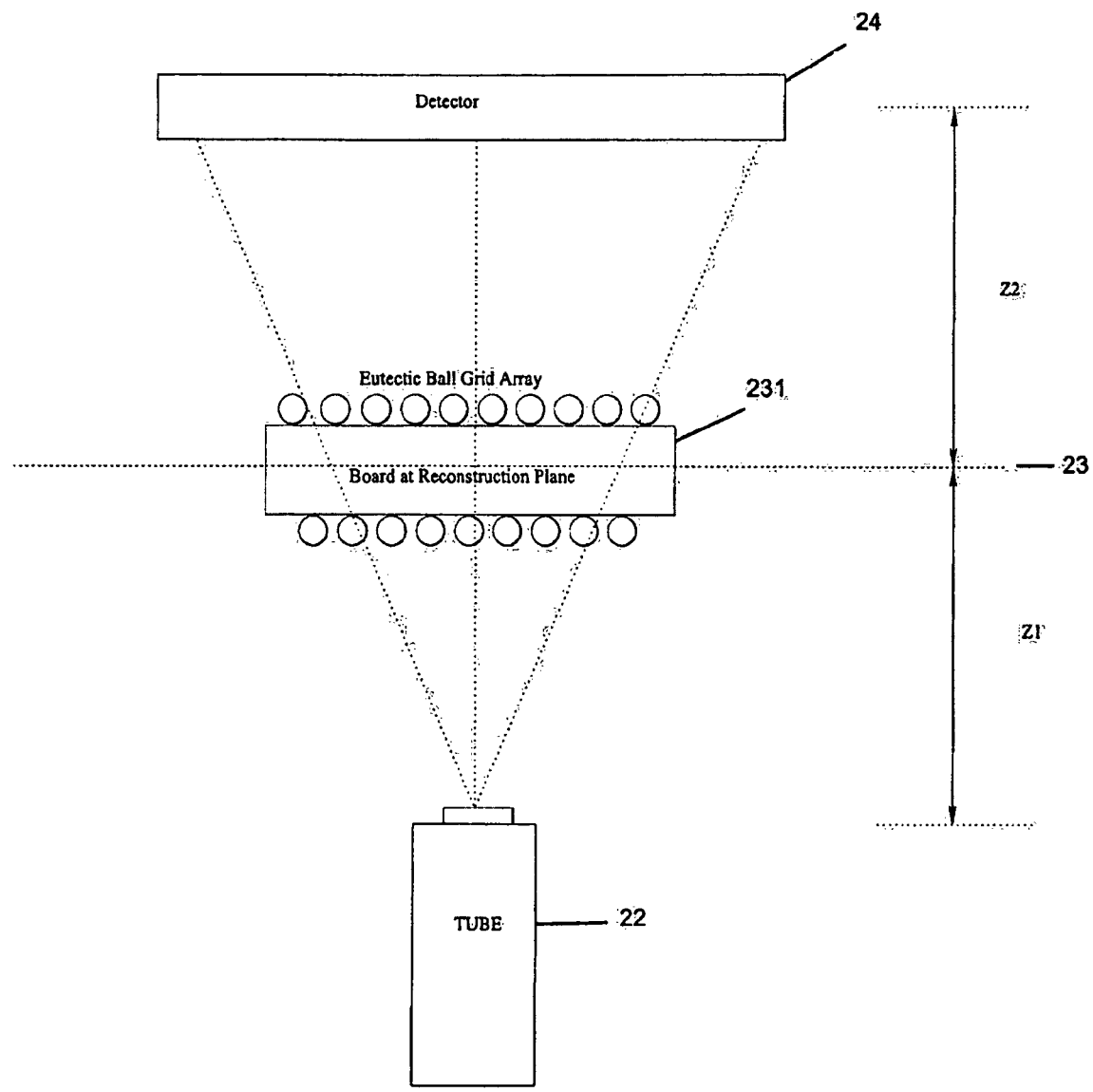
FIG. 2 shows an inspection system according to another embodiment.

An object that is to be inspected (or imaged) (see, for example, object 231 of FIG. 2) is positioned at a reconstruction plane (or image plane) 23 located between the source 22 and the detector 24. With continued reference to FIG. 1, the reconstruction plane 23 is spaced at a distance Z1 from the focal spot of the source 22 and at a distance Z2 from the detector 24. The distances Z1, Z2 can be adjusted to suitably provide a desired field of view (FOV) of the object. During inspection, a voltage (such as, but not limited to, a voltage of approximately 110 kilovolts) and a current (such as, but not limited to, a current ranging from approximately 0.070 milliamps to approximately 0.140 milliamps) are applied to the source 22 for producing X-ray energy. Accordingly, the source 22 produces X-ray energy, which penetrates or is absorbed by the object 231, and penetrating X-ray energy is detected by one or more region(s) of the detector 24.

Figure 3A:
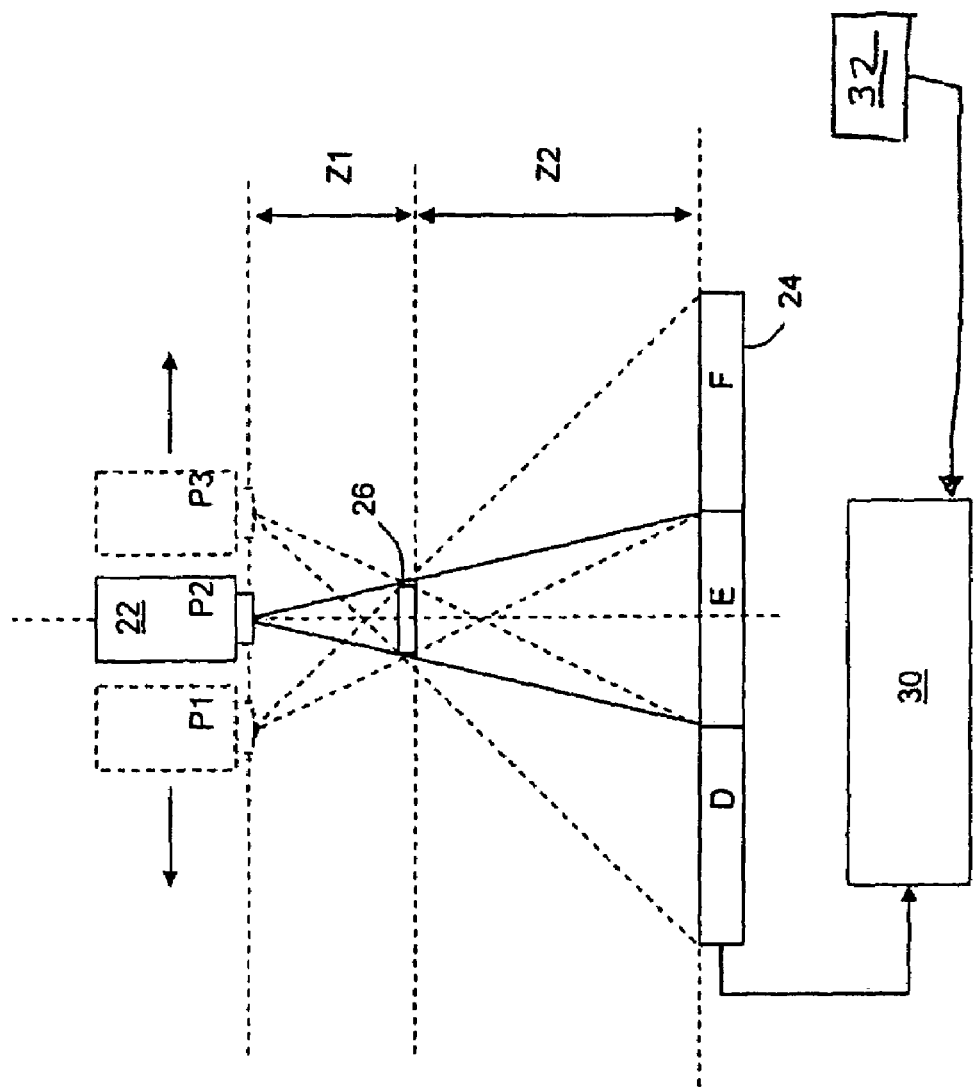
FIG. 3A shows an inspection system according to another embodiment.

With reference to FIG. 3A, according to one embodiment, the source 22 can be moved to different positions (see, e.g., positions P1, P2, P3) with respect to object 26 to provide different views of the object 26. Here, the position of the object 26 is kept generally fixed, and the distance Z1 is kept constant as the source 22 is moved. Although FIG. 3A shows that the source 22 is moved generally along a first dimension (i.e., towards the left or the right in FIG. 3A), those skilled in the art will appreciate that the source 22 may also be moved generally along a dimension perpendicular to the first dimension (i.e., a direction pointing out from or into the figure) to provide different views of the object 26.

Figure 3B:
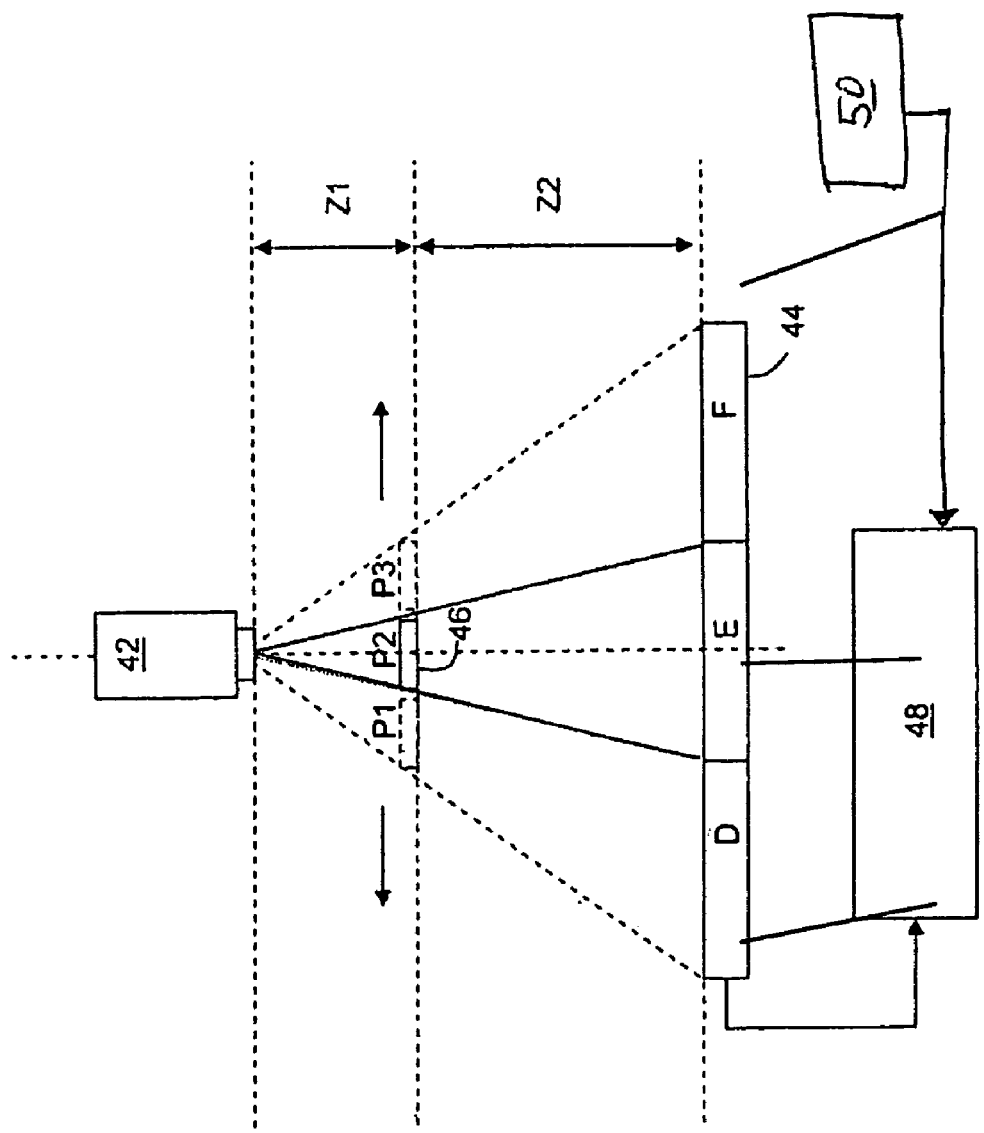
FIG. 3B shows an inspection system according to another embodiment.

With reference to FIG. 3B, according to another embodiment, the source 42 remains stationary, while the object 46 is moved generally along the dimensions described in the above paragraph (see, e.g., positions P1', P2', P3'). Similar to the embodiment of FIG. 3A, the detector 44 is positioned opposite the source 42.

In certain embodiments, the detector 24, 44 is a solid-state device that receives the penetrating X-ray energy (including X-ray energy attenuated by the object) and accordingly produces image data (such as, but not limited to, grayscale image values). For example, each pixel of the detector 24, 44 produces a grayscale value according to the energy that it detects. The grayscale values may serve as an indicator of X-ray absorption by the object. For example, a darker value may correspond to a lower amount of detected energy, which may indicate that a corresponding portion of the object is thicker and/or more absorbent. Conversely, a lighter value may correspond to a higher amount of detected energy, which may indicate that a corresponding portion of the object is less thick and/or less absorbent. In certain embodiments, the output values are sent to an image processor and/or viewer for processing and/or viewing (see, for example, processor/viewer 30 in FIG. 3A and processor/viewer 48 in FIG. 3B).

In certain embodiments, a beam monitoring device (see, for example, the monitoring device 32, 50 of FIG. 3A, 3B) may be used in addition to, or in place of, the detector. In a particular embodiment, the beam monitoring device is a photodiode. Similar to the detector 24, 44, the beam monitoring device is for detecting X-ray energy. In certain embodiments, the beam monitoring device is coupled with the processor/viewer 30, 48. As such, it is understood that measurements provided by the detector 24, 44, as described above, may also be provided by the beam monitoring device.

Classical digital radiography techniques rely on X-ray flux to distinguish high contrast features. Tomosynthesis techniques rely on X-ray flux measurements from different angles (or views) to form an image using a density map of an object. Here, at each angle, the performance of the measurement is essentially identical (or similar) to taking a conventional X-ray image. Both types of techniques, however, require a line integral of the resulting two-dimensional raw images, referred to herein as projections. Assuming that X-ray photons are mono-energetic, an equation that relates the output X-ray energy (e.g., energy that has not been absorbed by an object and is detected by the detector 24) to that of the input X-ray energy (e.g., the energy that is produced by the source 22 and is incident on the object) is:

$$I = I_0 e^{-\mu \Delta x}. \tag{1}$$

In equation (1), I is the output X-ray energy, $I_0$ is the input X-ray energy, $\Delta x$ is the thickness of the object (or a corresponding portion thereof), and $\mu$ is the linear attenuation coefficient (or absorption coefficient) of the object material. The above equation, also known as the Beer-Lambert law, expresses output energy as a function of input energy and the object material. Based on equation (1), it can be appreciated that materials having higher $\mu$ values produce higher levels of X-ray attenuation relative to materials having lower $\mu$ values. The higher levels of X-ray attenuation result in lower output energy (assuming that input energy levels are equal in both cases). In the case of air, the value of $\mu$ is approximately zero. Therefore, when the "object" positioned between an X-ray source and a detector is essentially air, the output energy I is theoretically equal to the input energy $I_0$ because $e^0 = 1$.

Where a non-uniform object is under examination (e.g., the object is made of multiple materials having different attenuation coefficients), the overall attenuation characteristics can be modeled as follows. If the object is considered as being composed of multiple (e.g., N) objects, each having a uniform thickness of $\Delta x$, the exit X-ray flux from one object may be treated as the entrance X-ray flux to an adjacent object. Mathematically, this model can be expressed as:

$$I = I_0 e^{-u_1 \Delta x} e^{-u_2 \Delta x} e^{-u_3 \Delta x} \ldots e^{-u_n \Delta x} = I_0 e^{-\sum_{n=1}^{N} u_n \Delta x}. \tag{2}$$

Dividing both sides of equation (2) by $I_0$ and taking the negative natural logarithm of both sides of the resulting equation produces:

$$\hat{p} = -\ln\left(\frac{I}{I_0}\right) = -\sum_{n=1}^{N} \mu_n \Delta x. \tag{3}$$

In equation (3), $\hat{p}$ is a mathematical representation of the two-dimensional image, or projection. As $\Delta x$ approaches zero, $\hat{p}$ approaches the integral of an attenuation coefficient function over the length (or thickness) L of the object:

$$\hat{p} = -\ln\left(\frac{I}{I_0}\right) = -\int_L \mu(x)dx. \quad (4)$$

As such, equation (4) expresses the negative natural logarithm of the ratio of the output X-ray energy (or intensity) to the input X-ray energy as a line integral of the attenuation coefficients along the X-ray path.

A theoretical approach of defining a linear relationship between output energy and object thickness has been presented in a paper entitled "X rays linear attenuation coefficient in steel. I. Thickness dependence" by V. Dorobantu (NDT.net, December 2004, Vol. 12, No. 12), which is available at http://www.ultrasonic.de/article/v09n12/dorobanti-dorobant.htm.

In contrast, embodiments of the invention are directed towards defining a linear relationship in a more finite and deterministic manner—e.g., in a more finite and deterministic period of time. As such, the described embodiments offer computational and processing benefits over the more theoretical approach described in the above paper.

Referring back to equation (1), this formulation provides valid results only if the input X-ray energy $I_0$ is mono-energetic. For situations in which an X-ray source is non-collimated and therefore produces poly-energetic energy $I_0'$ that is incident upon an object under examination, a different model is provided according to an embodiment of the present invention.

According to one embodiment, the relationship between the output energy I and the poly-energetic energy $I_0'$ is modeled as:

$$I = I_0' e^{-\frac{u}{\sqrt{l}}l}. \quad (5)$$

In equation (5), $\mu$ is the X-ray absorption coefficient (which depends on the material of the object and its density), and l is the thickness of the material.

Equation (5) can be mathematically rewritten as:

$$\ln\left(\frac{I_0'}{I}\right) = \frac{u}{\sqrt{l}} l \text{ and} \quad (6)$$

$$\left(\ln\left(\frac{I_0'}{I}\right)\right)^2 = \mu^2 l = kl. \quad (7)$$

As such, in a further embodiment, a digitally corrected image can be represented as the square of the difference in the natural logarithm of the images:

$$I_{corr}^{bh} = (\ln(I_0') - \ln(I))^2 = kl. \quad (8)$$

According to one embodiment, the calculations expressed in any of equations (5), (6), (7) and/or (8) are performed at a processor (see, for example, processor 30, 48 of FIG. 3A, 3B).

Figure 4:
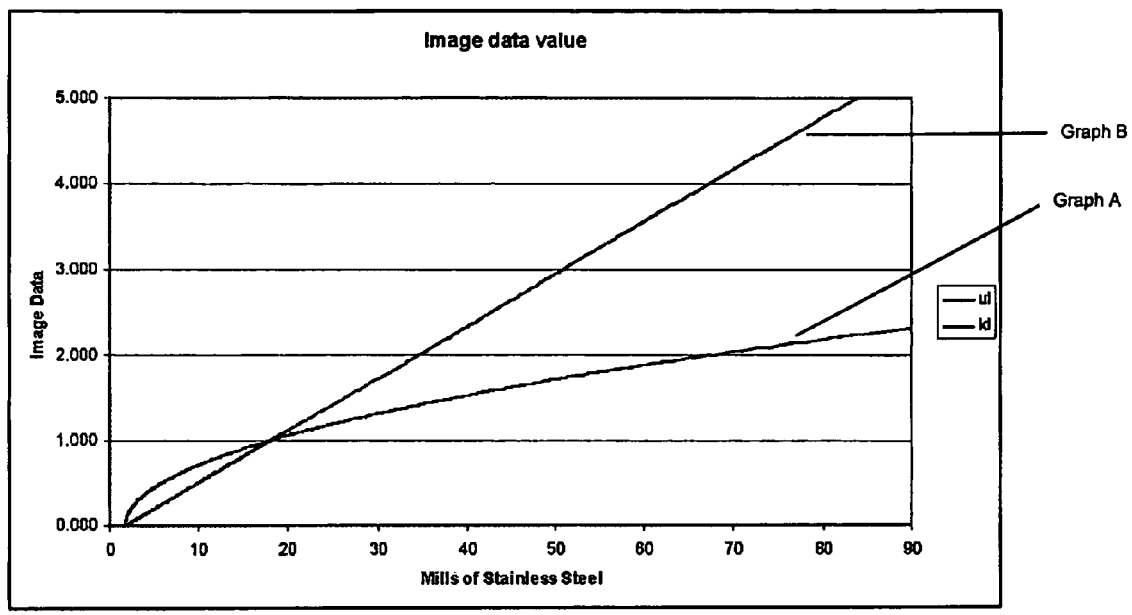
FIG. 4 shows a graph depicting a linear relationship provided according to one embodiment.

With reference to FIG. 4, for illustrative purposes, relationships between thickness of a object made of stainless steel and image data are shown in graph form. It is understood that the image data plotted in FIG. 4 is produced using energy that is poly-energetic and/or that is generated by a source (see, for example, source 22 of FIG. 1) that is non-collimated.

Graph A shows a relationship as provided by the Beer-Lambert law (see equation (1) above). Here, the relationship between object thickness and image intensity is non-linear.

In contrast, Graph B shows a relationship as provided by equation (8) above. As shown, the relationship between the square of the difference in the natural logarithm of the images and the object thickness is generally linear (i.e., having a slope k, which is equal to $\mu^2$). As such, the linearized image data can be used to more readily produce an estimate of the object thickness.

In a further embodiment, the processed image data is scaled according to a scale factor $S_c$ that may be empirically determined. That is, $$I_{corr}^{final}(i,j) = I_{white} - I_{corr}^{bh}(i,j) \times S_c. \quad (9)$$

In equation (9), $I_{white} = 4095$ $S_c$ is the scale factor that is empirically determined.

According to described embodiments, image data is produced using an X-ray source that is non-collimated. Therefore, the energy produced by the source is poly-energetic. In contrast, in other known applications of X-ray energy (such as, but not limited to, medical X-ray imaging), X-ray sources are collimated and therefore produce mono-energetic energy. There, the beams are reduced to a minimum beam width (e.g., "pencil" beams) to avoid over-exposure of patients to X-ray energy. Collimation adds considerable complexity and expense to design and manufacture of imaging devices and systems. According to embodiments of the present invention, X-ray sources are free of such collimation hardware.

In further embodiments, the linearization of image data, as described with reference to certain embodiments, may be performed in conjunction with a calibration of the image data, as further described in co-pending U.S. application co-pending U.S. patent application Ser. No. 12/193,321 filed on the same date herewith entitled "Method of and System for Calibration of Inspection Systems Producing X-Ray Images". This co-pending application is owned by the Assignee of the present application, and the entire contents of the co-pending application are incorporated herein by reference.

It should be understood that various modifications may be made to the embodiments disclosed herein. Therefore, the above description should not be construed as limiting, but merely as exemplification of the various embodiments. By way of example, although certain embodiments have been described with respect to X-ray energy, other embodiments may employ other suitable forms of electromagnetic energy. In addition, other embodiments may be used for imaging assemblies for purposes other than inspection and quality control. Those skilled in the art will envision other modifications within the scope and spirit of the claims appended thereto.

What is claimed is:

1. A system for linearizing image data corresponding to one or more objects and output by an imaging device, the system comprising:
    a processor configured for:
        receiving the image data from the imaging device; and
        producing a generally linear relationship between the image data and a thickness of the one or more objects,
    wherein the generally linear relationship is produced according to the equation $$I = I_0 e^{-\frac{u}{\sqrt{l}}t},$$

and
    wherein I is an intensity of the image data, $I_0$ is an intensity of energy produced by the imaging device for outputting the image data, μ is an attenuation coefficient of the one or more objects, and l is the thickness of the one or more objects.

2. The system of claim 1, wherein the energy produced by the imaging device for outputting the image data is poly-energetic.

3. The system of claim 2, wherein the poly-energetic energy is poly-energetic X-ray energy.

4. The system of claim 1, wherein the energy produced by the imaging device is produced by a non-collimated source of the imaging device.

5. The system of claim 4, wherein the image data are produced by the imaging device free of one or more devices for collimating the energy produced by the source.

6. The system of claim 4, wherein image data are produced by the imaging device free of one or more devices for beam hardening the energy produced by the source.

7. The system of claim 1, wherein the processor is configured further for processing the image data using tomosynthesis.

8. A system for linearizing image data corresponding to one or more objects and output by an imaging device, the system comprising:
    means for receiving the image data from the imaging device; and
    means for producing a generally linear relationship between the image data and a thickness of the one or more objects,
    wherein the generally linear relationship is produced according to the equation $$I = I_o e^{\frac{u}{\sqrt{l}} l},$$

and
wherein I is an intensity of the image data, $I_0$ is an intensity of input energy produced by the imaging device for outputting the image data, μ is an attenuation coefficient of the one or more objects, and l is the thickness of the one or more objects.

9. The system of claim 8, wherein the energy produced by the imaging device for outputting the image data is poly-energetic.

10. The system of claim 9, wherein the poly-energetic energy is poly-energetic X-ray energy.

11. The system of claim 8, wherein the energy produced by the imaging device is produced by a non-collimated source of the imaging device.

12. The system of claim 8, wherein the image data are produced by the imaging device free of one or more devices for collimating the energy produced by the source.

13. The system of claim 8, wherein image data are produced by the imaging device free of one or more devices for beam hardening the energy produced by the source.

14. The system of claim 8, wherein the means for producing is configured further for processing the image data using tomosynthesis.

15. A method for linearizing image data corresponding to one or more objects and output by an imaging device, the method comprising:
    receiving the image data from the imaging device; and
    producing a generally linear relationship between the image data and a thickness of the one or more objects,
    wherein the generally linear relationship is produced according to the equation $$I = I_o e^{-\frac{u}{\sqrt{l}} l},$$

and
wherein I is an intensity of the image data, $I_0$ is an intensity of energy produced by the imaging device for outputting the image data, μ is an attenuation coefficient of the one or more objects, and l is the thickness of the one or more objects.

16. The method of claim 15, wherein the energy produced by the imaging device for outputting the image data is poly-energetic.

17. The method of claim 16, wherein the poly-energetic energy is poly-energetic X-ray energy.

18. The method of claim 15, wherein the energy produced by the imaging device is produced by a non-collimated source of the imaging device.

19. The method of claim 18, wherein the image data are produced by the imaging device free of one or more devices for collimating the energy produced by the source.

20. The method of claim 18, wherein image data are produced by the imaging device free of one or more devices for beam hardening the energy produced by the source.

* * * * *